(12) United States Patent
Moritz

(10) Patent No.: US 12,043,346 B2
(45) Date of Patent: Jul. 23, 2024

(54) WIND POWER PLANT

(71) Applicant: TJOLOLO AB, Västerås (SE)

(72) Inventor: Bertil Moritz, Västerås (SE)

(73) Assignee: TJOLOLO AB, Västerås (SE)

( * ) Notice: Subject to any disclaimer, the term of this patent is extended or adjusted under 35 U.S.C. 154(b) by 0 days.

(21) Appl. No.: 18/263,095

(22) PCT Filed: Jan. 26, 2022

(86) PCT No.: PCT/SE2022/050075
§ 371 (c)(1),
(2) Date: Jul. 26, 2023

(87) PCT Pub. No.: WO2022/164368
PCT Pub. Date: Aug. 4, 2022

(65) Prior Publication Data
US 2024/0034436 A1 Feb. 1, 2024

(30) Foreign Application Priority Data
Jan. 28, 2021 (SE) .................... 2100014-6

(51) Int. Cl.
| | |
|---|---|
| B63B 1/10 | (2006.01) |
| B63B 1/12 | (2006.01) |
| B63B 21/50 | (2006.01) |
| B63B 35/44 | (2006.01) |
| F03D 13/25 | (2016.01) |

(52) U.S. Cl.
CPC .............. *B63B 1/107* (2013.01); *B63B 21/50* (2013.01); *B63B 35/44* (2013.01); *F03D 13/256* (2023.08); *B63B 2001/126* (2013.01); *B63B 2035/446* (2013.01); *F05B 2240/95* (2013.01)

(58) Field of Classification Search
CPC ......... B63B 1/107; B63B 21/50; B63B 35/44; B63B 2035/446; B63B 2001/126; F03D 13/256; F05B 2240/95
See application file for complete search history.

(56) References Cited

U.S. PATENT DOCUMENTS

| | | | |
|---|---|---|---|
| 7,156,037 B2 * | 1/2007 | Borgen | .................. F03D 13/22 290/44 |
| 8,471,396 B2 | 6/2013 | Roddier et al. | |
| 2015/0298772 A1 | 10/2015 | Copple | |
| 2016/0018434 A1 | 1/2016 | Peppas | |

FOREIGN PATENT DOCUMENTS

| | | |
|---|---|---|
| DK | 201670747 A1 | 4/2017 |
| EP | 2789848 B1 | 9/2016 |
| SE | 0802468 A1 | 5/2010 |
| WO | 2019152477 A1 | 8/2019 |

OTHER PUBLICATIONS

International Search Report for PCT/SE2022/050075 mailed Apr. 6, 2022, 3 pages.
Written Opinion of the ISA for PCT/SE2022/050075 mailed Apr. 6, 2022, 6 pages.

* cited by examiner

*Primary Examiner* — Stephen P Avila
(74) *Attorney, Agent, or Firm* — NIXON & VANDERHYE

(57) ABSTRACT

A semi-submersible wind power platform includes a tower and a plurality of arms for stabilizing the tower, each arm having a float experiencing an anchoring force. Each arm consists of two elongated elements forming with part of the tower a triangle, and at least one of the elongated elements includes a catenary element.

20 Claims, 5 Drawing Sheets

WIND POWER PLANT

CROSS-REFERENCE TO RELATED APPLICATIONS

This application is the U.S. national phase of International Application No. PCT/SE2022/050075 filed Jan. 26, 2022, which designated the U.S. and claims priority to SE 2100014-6 filed Jan. 28, 2021, the entire contents of each of which are hereby incorporated by reference.

TECHNICAL FIELD

The present invention concerns a floating wind power plant for converting wind energy to electrical energy. Especially the invention concerns a floating platform including a wind generator for being moored at sea in a stable position and orientation. In particular the wind power plant comprises a semi-submersible platform.

BACKGROUND OF THE INVENTION

A wind turbine comprises a rotating machine which converts the kinetic energy from the wind into mechanical energy that is then converted to electric energy. Wind turbines have been developed for land-based installations as well as offshore installations. Most common wind turbines have the main rotor shaft arranged horizontally. They have a horizontal rotor shaft that is pointed towards the wind. Horizontal axis wind turbines generally have a tower and an electrical generator coupled to the top of the tower. The generator may be coupled directly or via a gearbox to the hub assembly and turbine blades.

Wind turbines have also been used for offshore applications. Since long offshore tower systems have been mounted into the sea bed. They are normally limited to shallow water depths up to 30 meters. However, by using a wider base, such as a framework structure for better stability, the shallow depth requirement may be extended but only marginally. In deeper water only floating systems are expected to be economically feasible. To fully exploit wind energy offshore it is necessary to find economical solutions for deep water. Shallow water resources are limited and represent only a fraction of the offshore wind resources. Wind turbines close to shore may also block the shore view and create navigational obstructions and potential hazards for water vessels and aircrafts.

There are known a plurality of concepts for offshore floating wind turbine platforms. Generally, these fall into three main categories: Spars; Tension Leg Platforms (TLP); and semi-submersible systems.

A semi-submersible system comprises a wind generator carrying tower on a stabilizing submerged structure which is kept in balance by a plurality of buoyancy elements penetrating the sea surface. When comparing different types of offshore wind turbine structures, wave and wind induced motions are not the only elements of performance to consider. Economics play a significant role. It is therefore important to carefully study the fabrication, installation, commissioning costs and ease of access for maintenance methodologies. Semi-submersible concepts with a shallow draught and good stability in operational and transit conditions are significantly cheaper to tow out, install and commission.

From EP 2789848B1 (Komatsu) is previously known a floating body wind power generating device and method for anchoring the floating body wind power generation device. An objective of the wind power generation device is to provide a floating body wind power generating device with which it is possible to anchor the floating body stably with respect to drift force or rotational moment acting on the floating body. The wind power generating device comprises a wind power generator and a floating body. Further the device comprises a first column which is located on the upwind side of a primary wind direction and whereupon the wind power generator is installed. A second column and a third column which are located on the further downwind side of the primary wind direction than the first column are connected to the first column with two rower hulls to the first column. A plurality of anchoring cables connects the floating body to anchors. At least two of the plurality of anchoring cables is connected to the first column. At least one of the pluralities of anchoring cables is respectively connected to the second column and the third column. Each of the plurality of anchoring cables is positioned extending in radiating directions from the floating body so as not to intersect in planar view.

From U.S. Pat. No. 8,471,396 (Roddier) a column-stabilized offshore platform with water-entrapment plates and asymmetric anchoring system for support of offshore wind turbines is previously known. The floating wind turbine platform includes a floatation frame comprising three columns being coupled to each other with horizontal main beams. A wind turbine tower is mounted on top of a tower support column to simplify the system construction and improve the structural strength. The turbine blades are coupled to a nacelle that rotates on top of the tower. The turbine's gearbox generator and other electrical gear can be mounted either traditionally in the nacelle, or lower in the tower or in the top of the tower-supporting column. The floatation frame includes a water ballasting system that pumps water between the columns to keep the tower in a vertical alignment regardless of the wind speed. Water-entrapment plates are mounted to the bottoms of the columns to minimize the rotational movement of the floatation frame due to waves. The platform is connected to the seabed by anchor cables from each column.

From WO 2019/152477 (Sirnivas) a flexible aquatic substructure is previously known. A plurality of embodiments of a floating platform for carrying a wind mill tower is presented. As best understood by the description the example described in FIG. 4A is a preferred embodiment. The designated embodiment shows a column supported by three arms with buoyancy containers at their ends. Each arm is designed with a beam and wire system. The beam is welded or joined to the column and having a buoyancy container at its outer end. The outer end of the beam is connected to the upper end of the column with two wires and to the lower end of the column with two wires on diametric sides of the tower. The buoyancy containers comprise floating tanks containing gas. The weight of the tower and equipment is balanced with multiple buoyancy containers at the outer end of each arm.

In the embodiment shown the wires are prestressed and thus exercise a pressure load on the beam. For large substructures this pressure force may be huge and even greater when the substructure experience loads from wind and waves. Hence the beam must be made very stable and thus heavy. Not only must the beam be capable of bearing its own dead weight but also resist buckling rupture caused by the longitudinal pressure forces. For very large substructures the dimension of the beam may be cumbersome since it will lead to very big cross sections. According to the substructures presented in the document such a solution or design is not discussed or even mentioned in the document.

SUMMARY OF THE INVENTION

A primary object of the present invention is to seek ways to improve a floating wind power platform anchored at sea. Especially the invention seeks ways to improve a lightweight floating wind power platform comprising a tower and a plurality of stabilizing arms.

This object is achieved according to the invention by a floating wind power platform characterized by the features in the independent claim 1, or by a method characterized by the steps in the independent claim 9. Preferred embodiments are described in the dependent claims.

According to the invention each stabilizing arm of the floating wind power platform comprises a triangular construction consisting of two elongated element and part of the tower. Each arm comprises a float. At least one of the elongated elements comprises a catenary element. A catenary element is defined by a curve assumed by a cord of uniform density and cross section that is perfectly flexible but capable of transferring a traction force and that hangs freely from two fixed points.

In an embodiment of the invention the two elongated elements of each arm comprise a first elongated element and a second elongated element. In an embodiment the first elongated element comprises a catenary element. A catenary element may comprise wire, rope, line, cable, tube, hose or any element capable of resisting a tensile force and preferably be made of metal, plastics, composite fibres and such. In an embodiment the second elongated element comprises a strut element. A strut element may comprise a beam, a framework etc. Although a strut element by definition is designed to resist compression it is also capable to resist tensile forces. Thus a strut element, such as a beam, may be dimensioned to bear its own dead weight solely. Thereby such a beam may comprise a slender design.

The platform may be anchored or moored at sea and makes use of the anchoring force affecting each float in a direction of the arm to stabilize the tower. Thus by a sufficient anchor force acting on each float both elongated elements are kept stretched and thereby sustaining the vertical alignment of tower. The tower comprises a main float at its bottom. Each arm comprises a float at its distal end. Each float comprises a container that may be filled with a mixture of air and water to regulate the buoyancy force. In an embodiment the bottom part of the float comprises a ballast to stabilize the float in a vertical direction. The ballast may comprise a weight of high density such as iron ore. Thus by balancing the buoyancy force of the main float of the tower and the floats of the arms the platform may assume a stable construction in the sea.

By filling the containers with air or pumping out water the bouncy force will increase and the float will raise its position in the sea. Alternatively the float will stay still in the water but resist bigger forces. Thus by increasing the buoyancy force of the main float and decreasing the buoyancy force of the floats the tension force of the first elongated element increases and thereby keeping the tower in an upright position. In an embodiment the float will act as a plummet. By regulating the buoyancy force of the main float and the float the height position of the platform may be adjusted from a transport position to an operating position in which the platform is semi-submerged.

In an embodiment the strut element comprises a beam having an inner cavity. In an embodiment this cavity contains a mixture of water and air. When the platform is in its semi-submerged operating position the strut element is positioned under the water surface. In this position the mixture of water and gas may be regulated such that the buoyancy force counteracts the weight of the strut element. Thus an underwater strut element with a buoyancy force and having no pressure forces along the strut the design of the strut element may be very slim. In the underwater position the strut element will be less affected by slamming forces from the waves. In an embodiment the beam comprises two opposite cones.

To keep all elongated element stretched the tensile force from the anchor may be greater than the forces of the first and second elongated elements. The force vector of the anchor may be split up in a vertical component and a horizontal component. The vertical component is balanced by the buoyancy of the float. The horizontal component is balanced by the vectors along the first and second elongated element. According to the invention any feasible design of a floating platform with elongated arms may be balanced by a increasing the anchoring force.

A study of a power polygon where each force is represented by a vector reveals that the horizontal component of the anchor force must be equal to the horizontal components of the first and second elongated element. The power polygon further reveals the buoyancy effect of the tower may balance the forces of the polygon. However, the greater the anchoring force the less influence has the buoyancy of the tower. Thus by applying a sufficient anchoring force and direction each of the first and second elongated element may be brought to be exposed to tensile forces solely.

In an embodiment of the invention the float comprises an elongated container. The container is partly filled with a gas and partly filled by a floating medium. The gas may conveniently comprise air and the floating medium may comprise water. In an embodiment the container comprises a valve for regulating the air in and out from the container. By regulating the gas part in the container the buoyancy of the float is controlled as well as the submersed position in the sea. In an embodiment the float comprises at its bottom part a ballast weight to keep the float in a vertical position. This weight must preferably have a greater density than water. In an embodiment the ballast weight may comprise iron ore. Conveniently a tug boat is equipped with air pump facilities to regulate or adjust the gas volume of the float on site.

To reach its operation position the platform is submersed in the sea to an operating level. At this operating level the assembled cross-section areas of the floats are minimized in order to decrease the heave movements caused by the waves. The submersed operating level is accomplished by filling water into the floats. The volume of the floats is such that it only needs to be partly filled to reach the operational position. However it needs to be elongated enough in the vertical direction to protrude up through the water surface. The design of the float makes use of Archimedes principle. Thus when moving downwards it will experience an upwardly directed force equal to the volume of the displaced water. When moving upwards it will experience a downwardly directed force equal to the volume of the non-displaced water.

Since the three arms are symmetrically spread around the tower there will always be an equal amount of stabilizing forces on opposite sides of the tower. Hence when the tower tends to lean caused by wind forces the floats on the leeward side will exert an uprising force and simultaneously the floats on the upwind side will exert a traction force Thus at any given moment the floats on each side of the tower will exert opposite forces resulting in a turning effect which will put the tower in an upright position.

The necessary stabilizing force for keeping the tower in an upright position is thus provided by the buoyancy force of the tower and the buoyancy forces of the floats. Also the anchoring forces help stabilizing the tower. In an embodiment the buoyancy forces of the floats are negative. In an embodiment the buoyancy force of the tower is such that the floats are lifted in the water by the arms. Thus in this embodiment the floats act as plummets. This increase the tension force in the first elongated element, being the catenary element.

By using a small cross section area the imprint in the water will be small and therefore make the platform behave smoothly with a low heave motion. When a float is moving up and down in the sea from an equilibrium the displaced water volume will cause a buoyancy force. Thus when the float is moving upwards the buoyancy force is directed downwards and visa versa. This force acts like a spring where the cross-section area is the spring constant.

At an operating site the platform is moored or anchored by a plurality of anchor cables connected to the floats. The angle of the anchor cables with the horizontal plane is small. In an embodiment the orientation of the anchor cables towards the float is almost horizontal. Thus the anchor cables are tightly stretched and exerts severe tensile forces on each float. According to the invention these almost horizontal tensile forces are sufficient to stabilize the tower using tensile resisting elements only. Thus for each arm the anchoring force is balanced by the tensile forces of the first and second elongated elements. The horizontal component of the anchoring force is divided into the first and second elongated element of the arm. Thus a platform with three arms may be anchored by three anchors and yet be stable without using any pressure resisting element such as a beam.

In an embodiment of the invention the tower comprises a hollow structure carrying a pivotal nacelle and includes a main float. The main float is conveniently positioned at the lower end of the tower and containing a mixture of air and water. In an embodiment the tower is partly a framework structure. The main float is preferably designed to carry the weight of the tower and its equipment as well as the generator and rotor. A submersed position of the platform may be achieved by emptying part of the air in the main float and replace it with water. Thereby each float needs only to carry its own weight, part of the tower and the vertical component of the force from the anchor. By pumping air or water into and from the float the arm may be balanced to achieve the predetermined tensile forces in the upper elongated element at a normal operating position of the platform.

According to the invention a fair compromise is to make the arm approximately as long as the height of tower. In an embodiment of the invention the float comprises a cylindrical shape. In an embodiment the float or parts of the float comprises a conical or a funnel shape. By such design the cross-section area will increase by the submersion of the float and thus resulting in a non-linear increasing fore. Such design will effectively act as damping.

For erection, transport and service of the floating wind power platform the omitted forces from the anchor cables may be compensated. In an embodiment of the invention supplementary or temporary strut elements are being positioned between the tower and the floats. In an embodiment the lower elongated element comprises a slender strut element. Any strut element is suitable for resisting tensile forces. A strut element is also by definition capable of resisting pressure forces. However in the present case the strut element is not prestressed or affected by heavy pressure forces. According to the invention such strut element may be used to stabilize the tower during transport when the forces are small.

According to an embodiment of the invention the floats comprises docking means. In this embodiment the floating platform is made suitable for mooring to a stationary mooring system. The mooring system comprises a plurality of floating mooring elements being anchored at sea. Conveniently the mooring system comprises the same number of mooring elements as the number of floats of the floating platform. When mooring the floating platform each of the floats is positioned in front of a mooring element. By using the docking means each float and mooring element is tightly linked together to form a unity. By docking the floats and the mooring elements the mooring elements may be an integral part of the floats that by the arms stabilizes the tower. By this embodiment the floats of the platform may be designed to provide stabilizing forces under transport only but by help of the mooring element the combined float and mooring element may stabilize the platform at all weather conditions. The combined float and mooring element transfer every anchoring force.

In a first aspect the object is achieved by a semi-submersible wind power platform comprising a tower and a plurality of arms for stabilizing the tower, each arm having a float experiencing an anchoring force, wherein each arm consists of two elongated elements forming with part of the tower a triangle, and at least one of the elongated elements comprises a catenary element. In further aspects each float comprises an elongated container comprising a mid part containing a cylinder with a cross-section in the range of 10-20% of the length of the float, the first elongated element comprises a catenary element, the second elongated element comprises a catenary element, the second elongated element comprises a strut element, the strut element comprises elongated container filled with air, the tower comprises shortening means by which the arms is shortened to avoid slack in an anchor cable or in the elongated elements and the floats comprises means for docking with a dockable mooring element of a mooring system.

In a second aspect the object is achieved by a method for designing a semi-submersible wind power platform having a tower and a plurality of arms, the tower comprising a main float and each arm comprising a float experiencing an anchoring force, wherein each arm is formed to comprise a triangle consisting of two elongated elements and part of the tower, and designing at least one elongated element to be a catenary element. In further aspects the method further comprises: providing at the bottom of the float a ballast weight to stabilize the float, designing each float to comprise an elongated container and filling the container with a mixture of air and water to achieve a predetermined floating height in the sea.

BRIEF DESCRIPTION OF THE DRAWINGS

Other features and advantages of the present invention will become more apparent to a person skilled in the art from the following detailed description in conjunction with the appended drawings in which.

DESCRIPTION OF PREFERRED EMBODIMENTS

Figure 1:
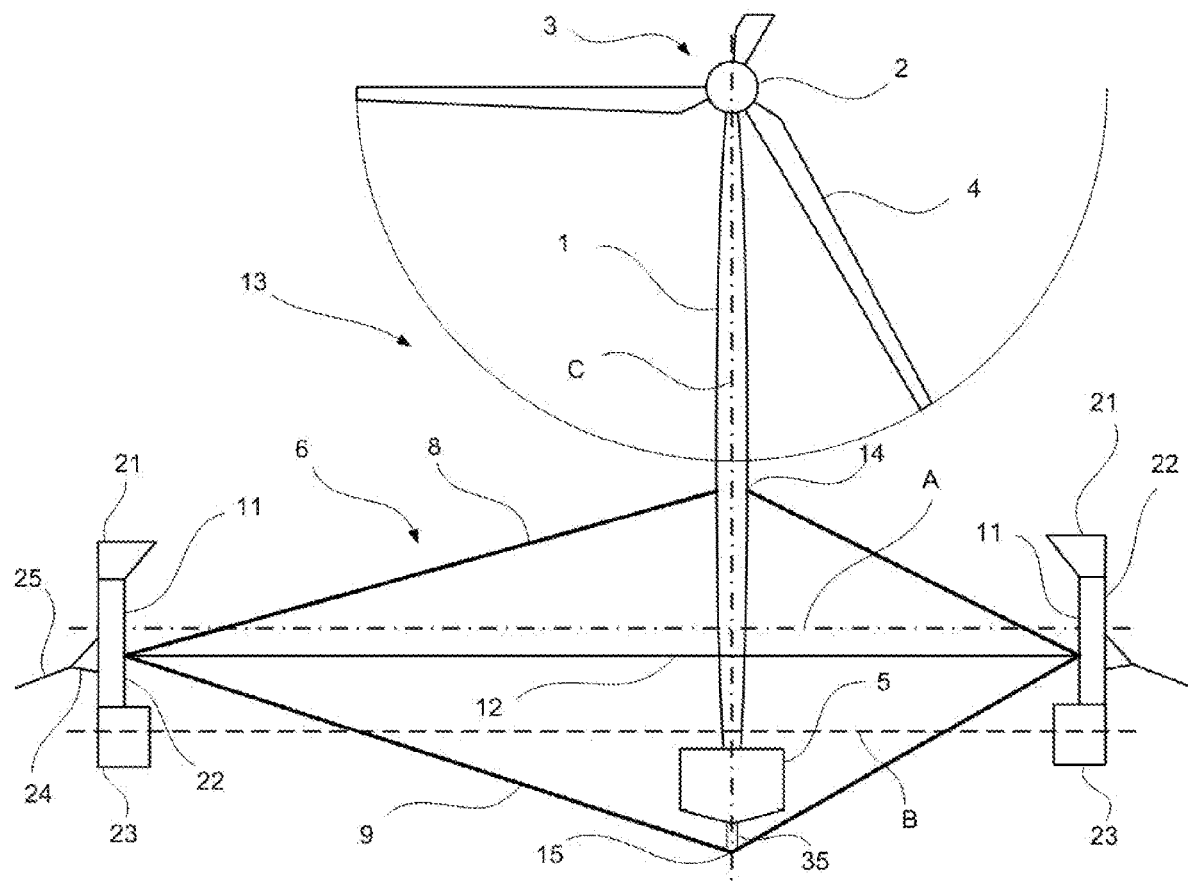
FIG. 1. is a side view of a floating wind power platform according to the invention, FIG. 2. is a plan view of the floating wind power platform, FIG. 3. Is a vector diagram and a force polygon of the forces acting on the float, FIG. 4. is a side view of a floating wind power platform according to an embodiment of the invention, and FIG. 5. Is a side view of an arm of a floating planform to dock with a mooring element of a mooring system.
Figure 2:
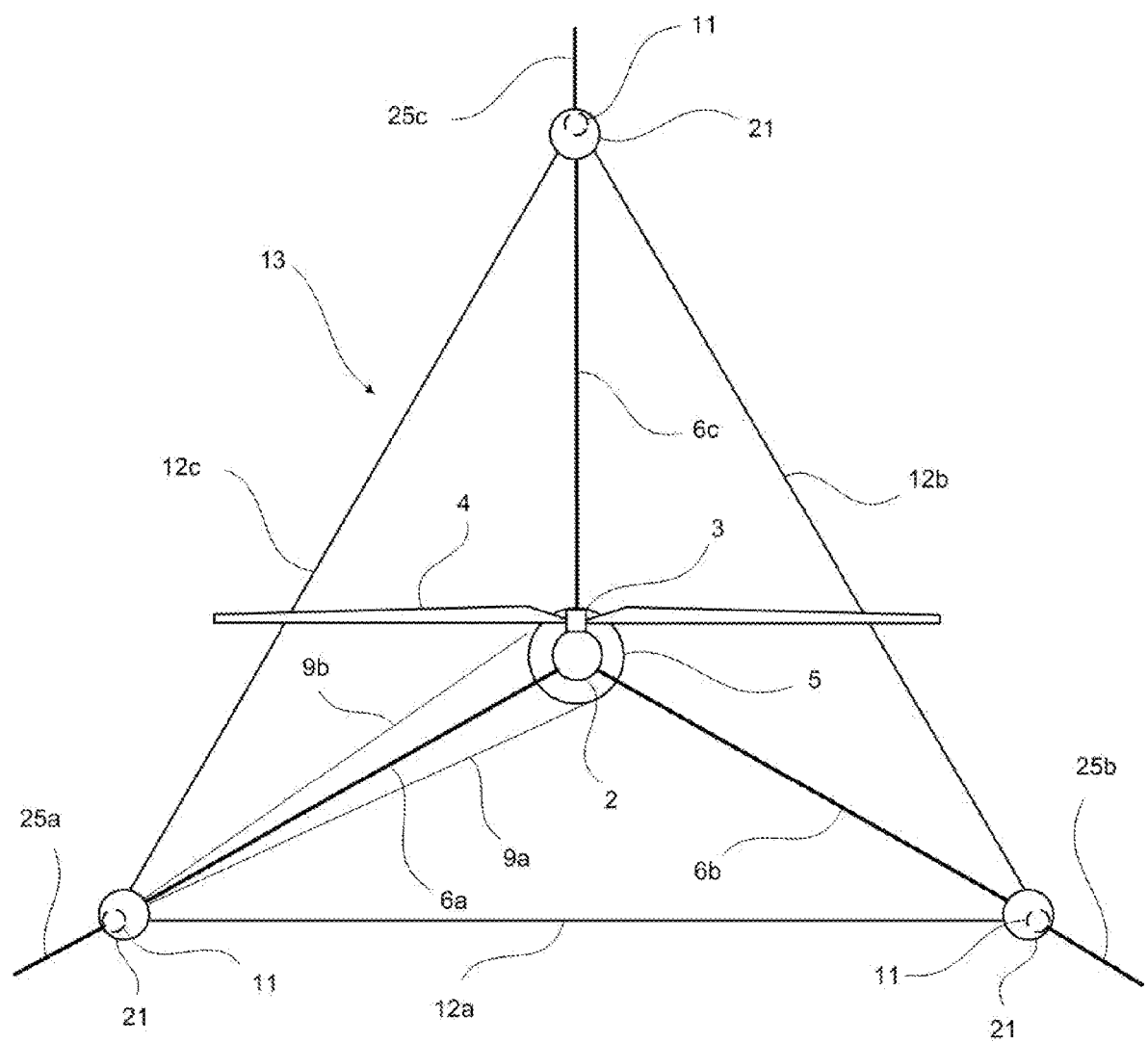

A floating wind power platform 13 according to the invention is shown in FIGS. 1 and 2. The platform comprises a tower 1 carrying a wind generator housed in a pivotal nacelle 2. The generator comprises a hub 3 with a rotor having a plurality of blades 4. In the embodiment shown the rotor has three blades but according to the invention there may be any number of blades. The platform further comprises a plurality of stabilizing arms 6. The tower comprises a main float 5. In the embodiment shown there are three arms. Each arm consists of a first elongated element 8, a second elongated element 9 and a float 11. In the embodiment shown the elongated elements comprise catenary elements 8 such as wires. The float 11 is attached to the distal end of the arm. The first elongated element 8 is connected to the float and to the tower in a first connection point 14 midways up on the tower. The second elongated element 9 is connected to the float and to the tower in a second connection point 15.

In the embodiment shown the second connecting point comprises a piston element 35 which may be pushed downwards. The movement may be achieved by a hydraulic pump. By this downwards protruding action the length of the arm may be shortened. In an embodiment where the floating platform is mooed to a mooring system this shortening of the arm length may be beneficial to tightening up mooring cables and the anchoring cables.

In the embodiment shown in FIG. 1 the floats 11 comprise an elongated structure. To decrease the vertical motion or the heave frequency of the platform the cross-section area of the float 11 must be kept small. By the expression small should in the context mean about 10% of the length of the structure. Thus the centre part 22 of the float comprises an elongated cylinder having a small cross section area. In the embodiment shown the upper part of the float 11 comprises a funnel shaped body 21. This funnel shaped body exerts a damping effect when moving in sea heave. In the embodiment shown the lower end of the float comprises a cylindric body 23 having a bigger cross section than the centre part. However the cylindric body 23 may have the same dimension as the centre part 22. This body may have a circular or square cross section. The cylindric body also exert a damping effect in the sea heave.

All parts of the float form a common cavity to be filled with a mixture of water and air for balancing purposes. The bottom part of the float may comprise a ballast weight 36 to stabilise the float in a vertical orientation. In an embodiment the ballast comprises iron ore. According to the embodiment shown the float 11 is anchored by an anchoring cable 25 to an anchor (not shown). In an embodiment the float comprises equipment for mooring or docking to a stationary mooring system. In the embodiment shown the anchoring cable is connected to the float by a span arrangement 24. In an embodiment the float comprises a straight cylinder.

According to the embodiment shown I FIG. 2 the three arms 6a, 6b and 6c are aligned symmetrically around the tower 1 and kept stretched by the anchoring cables 25. To further stabilize the platform each float is connected to each other with connecting wires 12. By the connecting wire the arms are equally spread around the tower. Since all arms 6 experience tensile forces from the anchoring cables 25 the tower 1 is hindered from rotating around its centre axis C. In order to further stabilize the orientation of the tower the second elongated element 9 of arm 6a is split into a first wire 9a and a second wire 9b connected crossways on either side of the main float 5. The tower rotating preventing arrangement may also comprise a span means between the end of the arm and the first float.

Figure 3:
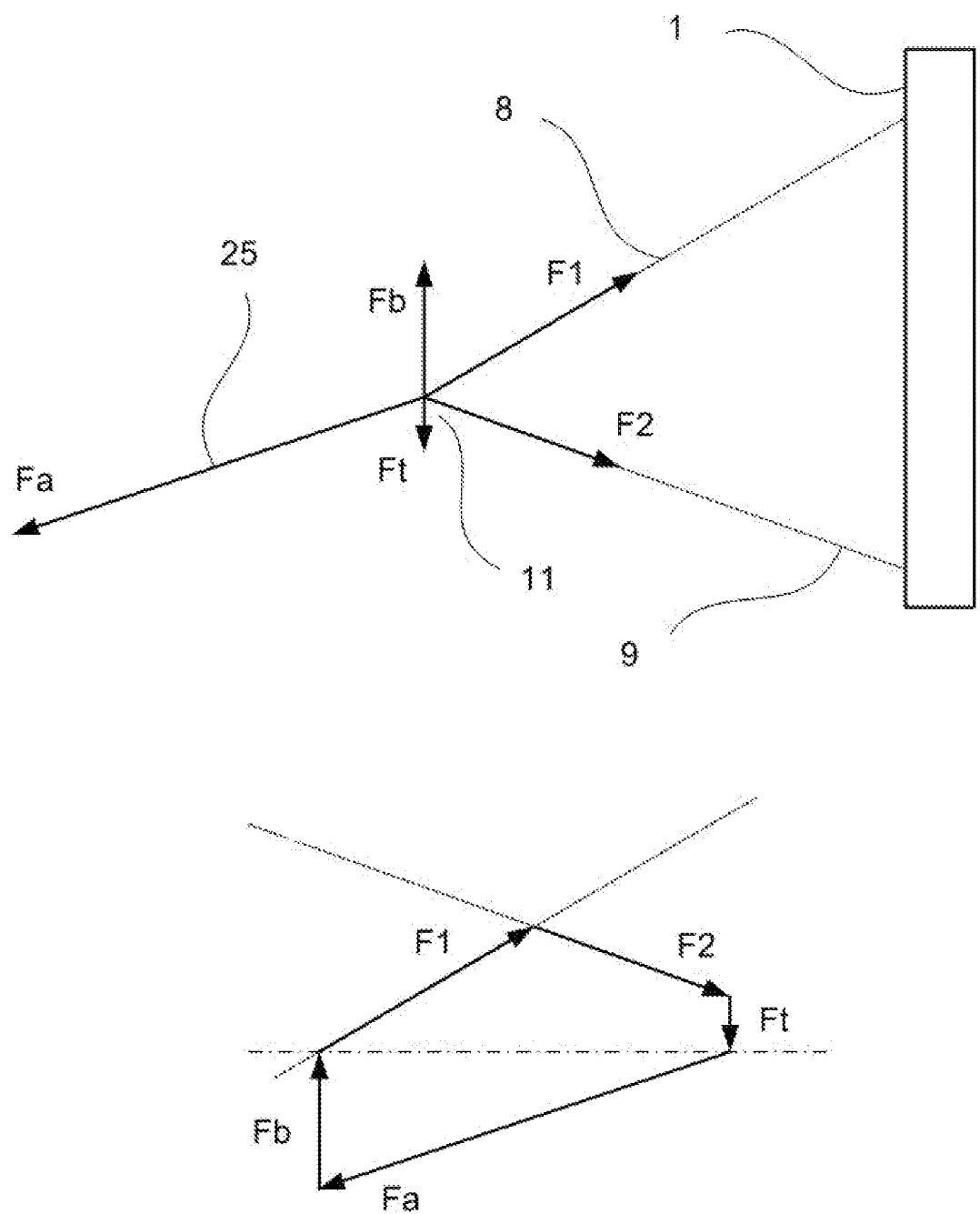

The vector diagram in FIG. 3 contains the main forces acting on the float. The first and second elongated element form together with part of the tower a triangular structure attached to the float. To keep all forces in balance the tensile force from the anchor must be equal to the tensile forces of the first and second elongated elements and the buoyancy of the float. Also the buoyancy force of the tower affects the vector diagram. The force denoted Fa represents the force of the anchoring cable 25 and Fb represents the vertical buoyancy force of the float 11. The force denoted F1 represents the tensile force of the first elongated element 8 and F2 represents the tensile force of the second elongated element 9. In the figure there is also a force denoted Ft which is the gravity force of the tower. However, since the tower comprises a main float the gravity of the tower may be balanced to zero. In the embodiment shown Ft is depicted downwards. This means that the tower exercises a loading effect on the float.

In the lower part of FIG. 3 all forces are connected in a force polygon. A study of the force polygon where each force is represented by a vector reveals that the horizontal component of the anchoring force Fa must be equal to the horizontal components of the first F1 and second F2 elongated element. It may also be concluded that the influence of the load of the tower must be kept small. If the float must bear also the weight of the tower the power polygon shows that there might be no tensile forces in the upper elongated element at all. But by balancing the tower to float by itself the polygon clearly shows that only tensile forces appear in the first and second elongated elements. Thus by applying a sufficient anchoring force and direction each of the first and second elongated element may experience tensile forces solely.

Figure 4:
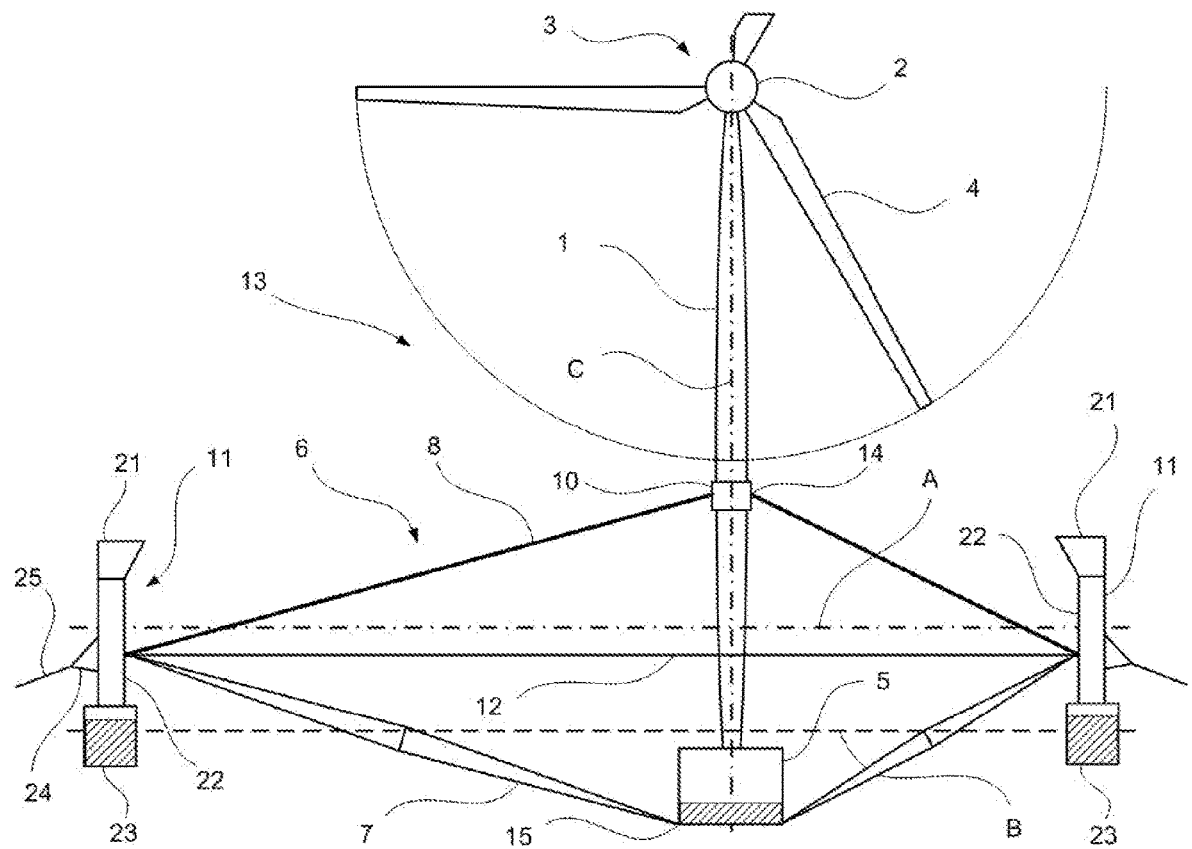

In an embodiment of the invention according to FIG. 4 the second elongated element 9 comprises a strut element 7. A strut element such as a beam is capable to resist not only pressure forces but also tensile forces. Since none or only small pressure forces are present in the second elongated element 9 at normal operation the strut element may be made slim. Although no pressure forces exist in the second elongated element a strut element is by definition capable of resisting pressure forces. This capacity is very handy when transporting the platform for maintenance or replacement. The strut element is positioned under water. This is beneficial since no slamming forces from the waves may affect the strut element. The design of the strut element may comprise cavities filled with air. The buoyancy effect of these air pockets makes the strut element less heavy in water. Thus the strut element may be made very slim. In the embodiment shown the strut element comprises a beam constructed as an air-filled container comprising two opposite cones.

The bigger a structure the more exposed is the structure for wave forces. Thus minimizing the exposure surface of the structure in the region were waves occur would be good design practice for a floating wind power plant. A submerged platform where only necessary parts penetrate the water surface is therefore beneficial to reduce slamming forces caused by waves. In an embodiment of the invention the lower elongated elements are positioned under water and only the tower and the three floats break the water surface. By keeping all these protruding structures small in horizontal cross section the whole platform will act calmly in the sea.

For transport the platform is raised to a float position by emptying water from the floats. In a transporting position all floats will be filled with air and the platform will rise to a level indicated by a dashed line B in FIG. 4. To stabilise the platform during transport strut element 7 shown in FIG. 4 may become handy. In its operating mode the strut element only takes tensile forces. But for transport in calm weather conditions the strut element provide sufficient pressure forces capability to stabilize the platform. Being transported to the site of operation the platform can either be anchored in a traditional way or being moored to a set of mooring elements of a prepositioned mooring system. The floats are in such a case equipped by docking means for mooring to such permanent mooring system.

The connection wires 12 are detachable and may be adjusted to facilitate a temporary angular rotation of two arms. In an embodiment two adjacent arms would resume a straight line which makes possible the tower coming close to a quay for maintenance. In an embodiment two arms may be folded to form a preferably perpendicular angle with the first arm which will allow mooring to a shorter quay. Hence the tower is enabled to approach the quay for secure mooring and maintenance.

Figure 5:
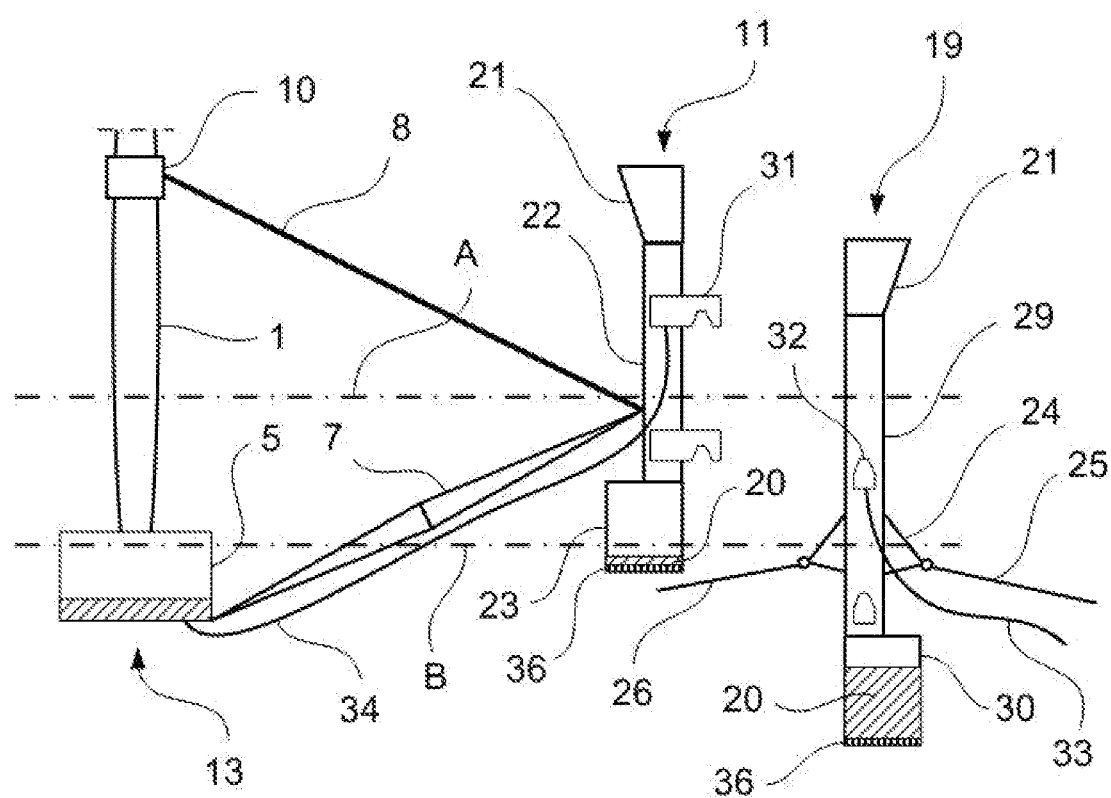

According to the invention the floating platform may be moored to a stationary mooring system equipped with docking means as shown in FIG. 5. The embodiment shown depict part of a floating platform 13 with a float 11 and a mooring element 19 of a mooring system. The floating platform comprises a tower 1 with a main float 5, a first elongated element 8, a second elongated element 7 and a float 11. In the embodiment shown the first elongated element 8 comprises a catenary element and the second elongated element 7 comprises a strut element. The float comprises a funnel shaped body 21, a centre part 22 and a lower body 23 forming together a common cavity.

The floating platform is raised to a transport level by emptying water 20 from inner cavity of the float 11 and the main float 5. In the embodiment shown the float comprises docking means 31 in the form of hooks. The mooring system comprises a plurality of mooring element 19 having a slim cylindric mid section 29 and a bigger cylindric lower body 30. The mooring element is held in position by an anchoring cable 25 and two positioning wires 26. Both the wires and the cables are attached to the mooring element by a span 24. For stabilizing purpose both the float and the mooring element comprises a ballast weight 36 in the bottom. As shown in FIG. 5 the mooring element may also comprise contact means to connect an external electric cable 33 with an internal electric cable 34.

In an embodiment of the invention the platform comprises means for shortening the arms. In the embodiment shown in FIGS. 4 and 5 the tower comprises a connecting ring 10 where all elongated elements are connected. According to the invention the connecting ring is displaceable up and down on the tower. As described above the two elongated elements form together with the tower a triangle. Thus by raising the ring the triangle will change its width. In an embodiment shown in FIG. 1 the shortening means comprises a piston 35 protruding out from beneath the main float 5. In the embodiment all of the second elongated elements are connected to the piston and thus by moving the piston the length of the arms is adjusted. This quality may come handy when docking. Thus when all floats are docked with mooring elements the length of the arms may be shortened to avoid slack in the anchor cables or the elongated elements.

The mooring element comprises docking means 32 in the form of transversal bars to be hooked by the docking means 31 of the floats. In the embodiment shown the mooring element is lowered to a level B by filling water 20 into the common cavity of the mooring element 19. In this position the mooring element 19 may receive the float 11. When the float and the mooring element are positioned face to face the docking means may dock by a relative vertical movement of the float and the mooring element. Thus the hook of the float may embrace the transversal bar of the mooring element. By balancing the amount of water 20 in the float and the mooring element the two elements may be docked with huge fastening forces. In an embodiment either of the float or the mooring element may comprise locking means (not shown). As shown in FIG. 5 the mooring element may also comprise contact means to connect an external electric cable 33 with an internal electric cable 34.

By the lightweight construction of the floating wind power platform the construction can be made very big. According to the invention the diameter of the rotor may be 200 m. The total height of the tower including the first float may be 130-150 m. The length of the arm may be in the range of 90-120 m. Hence the ratio between the arm and the tower would almost one. The height of the floats may be in the range of 20-50 m and the cross-section of the mid part in the range of 2-5 m. According to the invention the transport position of the platform is about 30 m higher that the submerged position. The draught of the platform under transport may be less than 9 meters.

Although favourable the scope of the invention must not be limited by the embodiments presented but also contain embodiments obvious to a person skilled in the art. For instance there could be more than three stabilizing arms. The wires may comprise any kind of material with good tensile properties. The floats may comprise a landing pad for a helicopter. The platform may arbitrary be moored in a traditionally way by a plurality of anchors and anchor cables. The tower may contain a transformer, HVDC equipment and/or other electrical equipment.

The invention claimed is:

1. A semi-submersible wind power platform comprising:
   a tower;
   a plurality of arms for stabilizing the tower,
   wherein each arm consists only of first and second elongated elements,
   wherein the first and second elongated elements of each arm, together with a part of the tower, form a triangle, and
   wherein at least one of the first and second elongated elements comprises a catenary element; and
   a float connected to each of the plurality of arms, each float affected by an anchoring force.

2. The semi-submersible wind power platform according to claim 1, wherein each float comprises an elongated container comprising a mid part containing a cylinder.

3. The semi-submersible wind power platform according to claim 1, wherein the first elongated element comprises the catenary element.

4. The semi-submersible wind power platform according to claim 1, wherein the second elongated element comprises the catenary element.

5. The semi-submersible wind power platform according to claim 1, wherein the second elongated element comprises a strut element.

6. The semi-submersible wind power platform according to claim 5, wherein the strut element comprises an elongated container filled with air.

7. The semi-submersible wind power platform according to claim 1, wherein the tower comprises shortening means by which the arms are shortened to avoid slack in an anchor cable or in the first and second elongated elements.

8. The semi-submersible wind power platform according to claim 1, wherein the floats comprise means for docking with a dockable mooring element of a stationary mooring system.

9. A method for designing a semi-submersible wind power platform comprising a tower; a plurality of arms for stabilizing the tower, wherein each arm consists only of first and second elongated elements, and wherein at least one of the first and second elongated elements comprises a catenary element; and a float connected to each of the plurality of arms, each float affected by an anchoring force, the method comprising:
 forming each arm, together with a part of the tower, to comprise a stabilizing triangle consisting of the first and second elongated elements and the part of the tower, and
 configuring at least one of the first and second elongated elements to be the catenary element.

10. The method according to claim 9, wherein the method further comprises configuring the float to comprise an elongated container and filling the container with a mixture of air and water to achieve a predetermined floating height in the sea.

11. The semi-submersible wind power platform according to claim 2, wherein the first elongated element comprises the catenary element.

12. The semi-submersible wind power platform according to claim 2, wherein the second elongated element comprises the catenary element.

13. The semi-submersible wind power platform according to claim 3, wherein the second elongated element comprises the catenary element.

14. The semi-submersible wind power platform according to claim 2, wherein the second elongated element comprises a strut element.

15. The semi-submersible wind power platform according to claim 3, wherein the second elongated element comprises a strut element.

16. The semi-submersible wind power platform according to claim 2, wherein the tower comprises shortening means by which the arms are shortened to avoid slack in an anchor cable or in the first and second elongated elements.

17. The semi-submersible wind power platform according to claim 3, wherein the tower comprises shortening means by which the arms are shortened to avoid slack in an anchor cable or in the first and second elongated elements.

18. The semi-submersible wind power platform according to claim 4, wherein the tower comprises shortening means by which the arms are shortened to avoid slack in an anchor cable or in the first and second elongated elements.

19. The semi-submersible wind power platform according to claim 5, wherein the tower comprises shortening means by which the arms are shortened to avoid slack in an anchor cable or in the first and second elongated elements.

20. The semi-submersible wind power platform according to claim 6, wherein the tower comprises shortening means by which the arms are shortened to avoid slack in an anchor cable or in the first and second elongated elements.

* * * * *